US008235196B2

(12) United States Patent
Kato et al.

(10) Patent No.: US 8,235,196 B2
(45) Date of Patent: Aug. 7, 2012

(54) ELECTROMAGNETIC CLUTCH

(75) Inventors: Motoi Kato, Gunma (JP); Yoshihiro Kurosu, Gunma (JP); Haruhiko Ushirode, Gunma (JP)

(73) Assignee: Ogura Clutch Co., Ltd., Gunma (JP)

( * ) Notice: Subject to any disclaimer, the term of this patent is extended or adjusted under 35 U.S.C. 154(b) by 571 days.

(21) Appl. No.: 12/486,643

(22) Filed: Jun. 17, 2009

(65) Prior Publication Data

US 2009/0314600 A1 Dec. 24, 2009

(30) Foreign Application Priority Data

Jun. 18, 2008 (JP) ................................. 2008-158828

(51) Int. Cl.
*F16D 27/01* (2006.01)
*F16D 27/105* (2006.01)
*F16D 43/25* (2006.01)
(52) U.S. Cl. ................. 192/84.31; 192/82 T; 192/84.81
(58) Field of Classification Search ............... 192/84.31, 192/82 T, 84.81
See application file for complete search history.

(56) References Cited

U.S. PATENT DOCUMENTS

| 3,263,784 | A | | 8/1966 | Pierce | |
|---|---|---|---|---|---|
| 5,404,980 | A | * | 4/1995 | Shafer | 192/82 T |
| 7,677,376 | B2 | * | 3/2010 | Schachtl et al. | 192/84.31 |
| 7,975,818 | B2 | * | 7/2011 | Pardee | 192/84.31 |

FOREIGN PATENT DOCUMENTS

| JP | 57-051025 | A | 3/1982 |
|---|---|---|---|
| JP | 59-005232 | Y | 2/1984 |
| JP | 59-027550 | Y | 8/1984 |
| JP | 63-011394 | Y | 4/1986 |
| JP | 08-135686 | A | 5/1996 |
| JP | 2006-200570 | A | 8/2006 |
| JP | 2007-333109 | A | 12/2007 |

* cited by examiner

*Primary Examiner* — David D Le
*Assistant Examiner* — Jacob S Scott
(74) *Attorney, Agent, or Firm* — Blakely, Sokoloff, Taylor & Zafman

(57) ABSTRACT

An electromagnetic clutch includes a rotor, armature hub, armature, magnetic body and first permanent magnet, field core, excitation coil, and second permanent magnet. The rotor is rotatably disposed in the housing of a driven device. The armature hub is fixed to the rotating shaft of the driven device, the armature movable in an axial direction. The magnetic body is incorporated in the rotor. The first permanent magnet connects the armature to the rotor. The field core is attached to the housing and inserted in the rotor to be in noncontact with it. The excitation coil is disposed in the field core and excited, when cutting off power transmission, to cancel a magnetic force of the first permanent magnet, thus releasing the armature from the first permanent magnet. The second permanent magnet separates the armature from the rotor, when cutting off power transmission, to move the armature toward the armature hub.

8 Claims, 10 Drawing Sheets

ELECTROMAGNETIC CLUTCH

BACKGROUND OF THE INVENTION

The present invention relates to an electromagnetic clutch which transmits power by utilizing a magnetic force generated by the magnetic flux of a permanent magnet and cuts off power transmission by energizing an excitation coil.

Various types of electromagnetic clutches which transmit power by a magnetic force generated by the magnetic flux of a permanent magnet (to be merely referred to as a magnetic force as well hereinafter) are conventionally proposed (see U.S. Pat. No. 3,263,784, Japanese Utility Model Publication No. 63-011394, and Japanese Patent Laid-Open No. 2007-333109).

A non-excitation actuation type electromagnetic clutch described in U.S. Pat. No. 3,263,784 includes a rotor attached to a rotating shaft, a hub rotatably attached to the rotating shaft through a bearing, an armature attached to the hub, and a permanent magnet and excitation coil which line up on the rotor in the axial direction. The rotor is formed of two members, i.e., an outer magnetic pole member and inner magnetic pole member which are integrally coupled by a compound made of a nonmagnetic material. The permanent magnet is interposed in a space formed between the flanges of the two magnetic pole members.

The permanent magnet forms a magnetic circuit in which a magnetic flux flows from the outer magnetic pole (the magnetic pole surface of the outer magnetic pole member) of the rotor to the inner magnetic pole (the magnetic pole surface of the inner magnetic pole member) of the rotor via the armature. The excitation coil forms a magnetic circuit in which a magnetic flux flows through a field core—an inner magnetic path member—the permanent magnet—an outer magnetic path member—the field core.

In the non-excitation actuation type electromagnetic clutch having the above structure, in a non-excitation state in which energization to the excitation coil is cut off, the frictional surface (magnetic pole surface) of the rotor magnetically attracts the frictional surface (magnetic pole surface) of the armature by the magnetic force of the permanent magnet, so that the rotor and armature are frictionally coupled to each other. For example, in a non-excitation actuation type electromagnetic clutch for a water pump, power of an engine is transmitted to a hub through a belt. Thus, while the engine is driven, the water pump is also driven. When cutting off power transmission to the water pump while the engine is driven, the excitation coil is energized, and a magnetic force generated by the magnetic flux of the excitation coil cancels the magnetic force of the permanent magnet. The armature is thus released from the magnetic force generated by the permanent magnet, so it separates from the rotor by a spring elastic restoration force, to cut off power transmission from the engine to the water pump.

In the non-excitation actuation type electromagnetic clutch described in Japanese Utility Model Publication No. 63-011394, a rotor is rotatably disposed on a stationary housing through a bearing. The rotor includes an inner cylindrical magnetic path portion (inner magnetic flux path portion), an outer cylindrical magnetic path portion (outer magnetic flux path portion), and a disc-like magnetic path portion (flange) which connects one end of the inner cylindrical magnetic path portion to one end of the outer cylindrical magnetic path portion. A pair of annular magnetic plates, a permanent magnet, and part of an excitation coil are incorporated in an annular groove defined by the three magnetic path portions.

The permanent magnet opposes the outer cylindrical magnetic path portion and inner cylindrical magnetic path portion at an appropriate gap and is sandwiched by the pair of annular magnetic plates. Of the pair of annular magnetic plates, one which is located on the deeper-end side than the permanent magnet in the annular groove opposes the inner surface of the disc-like magnetic path portion and that of the outer cylindrical magnetic path portion at an appropriate gap and is fixed to the outer surface of the inner cylindrical magnetic path portion. The other annular magnetic plate opposes the inner cylindrical magnetic path portion and excitation coil at an appropriate gap and is fixed to the inner surface of the outer cylindrical magnetic path portion. In the same manner as in the invention described in U.S. Pat. No. 3,263,784, when the permanent magnet magnetically attracts the armature to transmit power, the excitation coil is held in the non-excitation state. When cutting off power transmission, the excitation coil is energized and cancels the magnetic force of the permanent magnet in the same manner as in U.S. Pat. No. 3,263,784, thus cutting off power transmission.

In a power transmission mechanism described in Japanese Patent Laid-Open No. 2007-333109, in the same manner as in the electromagnetic clutch described in Japanese Utility Model Publication No. 63-011394, an excitation coil and a permanent magnet which is sandwiched by a pair of magnetic plates line up in the annular groove of a rotor in the axial direction. When transmitting power, the frictional surface of the rotor magnetically attracts an armature by the magnetic force of the permanent magnet. When cutting off power transmission, the excitation coil is energized similarly, so that the magnetic force of the permanent magnet is canceled and power transmission is cut off.

Each of the conventional electromagnetic clutches described in U.S. Pat. No. 3,263,784, Japanese Utility Model Publication No. 63-011394, and Japanese Patent Laid-Open No. 2007-333109 is usually employed as a power transmission device for a driven device such as a vehicle air-conditioning compressor or water pump. If, however, the rotating shaft of the driven device is locked (stopped) by an overload, or oil is externally attached between the frictional surfaces of the rotor and armature, abnormal slippage occurs between the rotor and armature, and the rotor rotates by slipping. When such slip rotation occurs, the frictional heat heats the rotor and armature instantly. Then, a belt that transmits the rotation of the driven device to the rotor may be burned, or the grease of the bearing that axially supports the rotor may flow out to seize the bearing, quickly rendering the electromagnetic clutch inoperative.

As a countermeasure for the slip rotation of the rotor caused by the overload or the like of the driven device, electromagnetic clutches described in Japanese Patent Laid-Open No. 57-051025, Japanese Utility Model Publication No. 59-027550, Japanese Patent Laid-Open No. 2006-200570, Japanese Patent Laid-Open No. 8-135686, and Japanese Utility Model Publication No. 59-005232 are known.

The electromagnetic clutch described in Japanese Patent Laid-Open No. 57-051025 which transmits power by the magnetic force of the magnetic flux generated by an excitation coil and includes a temperature fuse. When the frictional heat generated by slip rotation heats the temperature fuse and its vicinity, the fuse fuses by the heat and cuts off energization to the excitation coil, so an armature is released from a rotor.

In the electromagnetic clutch described in Japanese Utility Model Publication No. 59-027550, a housing for an input pulley and driven device is provided with a temperature detector and rotation pickup device opposing each other. When the temperature of the input pulley increases abnormally, the heat-shrinkable member of the temperature detector shrinks to cut off an output from the rotation pickup device. This cuts off energization to an excitation coil and causes the input pulley to idle.

The electromagnetic clutch described in Japanese Patent Laid-Open No. 2006-200570 includes a torque limiter which is connected to a clutch plate (armature) through an elastic member and rotates together with a rotating shaft. In the torque limiter, a hub flange is provided with a ball engaging groove, and a plate stacked on the flange is provided with an annular escape portion. A spherical member is interposed in the ball engaging groove. When the rotating shaft is locked by an overload, a large torque acts on the clutch plate, so the spherical member moves from the ball engaging groove to the escape portion, thereby releasing the clutch plate from the torque limiter. As a result, the clutch plate is separated from the rotor by the elastic force of the elastic member, and cuts off power transmission.

In the electromagnetic clutch described in Japanese Patent Laid-Open No. 8-135686, a damper mechanism connects an armature and hub to be separable. When the rotating shaft of a driven device is locked by an overload, a large torque acts on the elastic ring body (damper rubber) of the damper mechanism. Then, the elastic ring body elastically deforms and comes out from the gap between a pair of holding members, thereby disconnecting pulley and hub from each other.

In the electromagnetic clutch described in Japanese Patent Laid-Open No. 57-051025, however, power is transmitted and cut off by energizing and deenergizing an excitation coil. If the electromagnetic clutch is a so-called self-hold electromagnetic clutch which transmits power by connecting a rotor and armature by the electromagnetic force of a permanent magnet, a temperature fuse as shown in Japanese Patent Laid-Open No. 57-051025 cannot be employed.

Even the self-hold electromagnetic clutch can cut off power transmission to the rotating shaft of the driven device if it additionally includes a rotation pickup device or torque limiter mechanism as described in Japanese Utility Model Publication No. 59-027550 or Japanese Patent Laid-Open No. 2006-200570. In this case, however, the rotation pickup device must be mounted in the stationary housing of the driven device such that it opposes the pulley. Accordingly, an installation space is required, and the assembly operation becomes cumbersome. Also, the number of constituent components of the electromagnetic clutch increases, leading to a high product cost.

As the electromagnetic clutch described in Japanese Patent Laid-Open No. 8-135686 requires the damper mechanism, its installation space is larger than that of the spring type electromagnetic clutch described in Japanese Patent Laid-Open No. 2007-333109, Japanese Utility Model Publication No. 59-027550, Japanese Utility Model Publication No. 59-005232, and the like which transmits torque by utilizing rolling force generated by torsional deformation of a clutch spring. Also, the number of components increases, so the product cost increases.

SUMMARY OF THE INVENTION

It is an object of the present invention to provide a self-hold electromagnetic clutch in which belt burnout, bearing seizure, and the like caused by frictional heat upon slip rotation of a rotor can be prevented.

In order to achieve the above object, according to the present invention, there is provided an electromagnetic clutch comprising a rotor rotatably disposed in a housing of a driven device, an armature hub fixed to a rotating shaft of the driven device, an armature disposed on the armature hub to be movable in an axial direction, a magnetic body incorporated in the rotor and a first permanent magnet which connects the armature to the rotor, a field core attached to the housing and inserted in the rotor to be in noncontact therewith, an excitation coil which is disposed in the field core and excited, when cutting off power transmission, to cancel a magnetic force of the first permanent magnet, thus releasing the armature from the first permanent magnet, and a second permanent magnet which separates the armature from the rotor, when cutting off power transmission, to move the armature toward the armature hub, wherein the first permanent magnet has a Curie temperature lower than a temperature of heat generated by the rotor upon slip rotation.

DESCRIPTION OF THE PREFERRED EMBODIMENTS

The present invention will be described in detail hereinafter based on preferred embodiments shown in the accompanying drawings.

Figure 1:
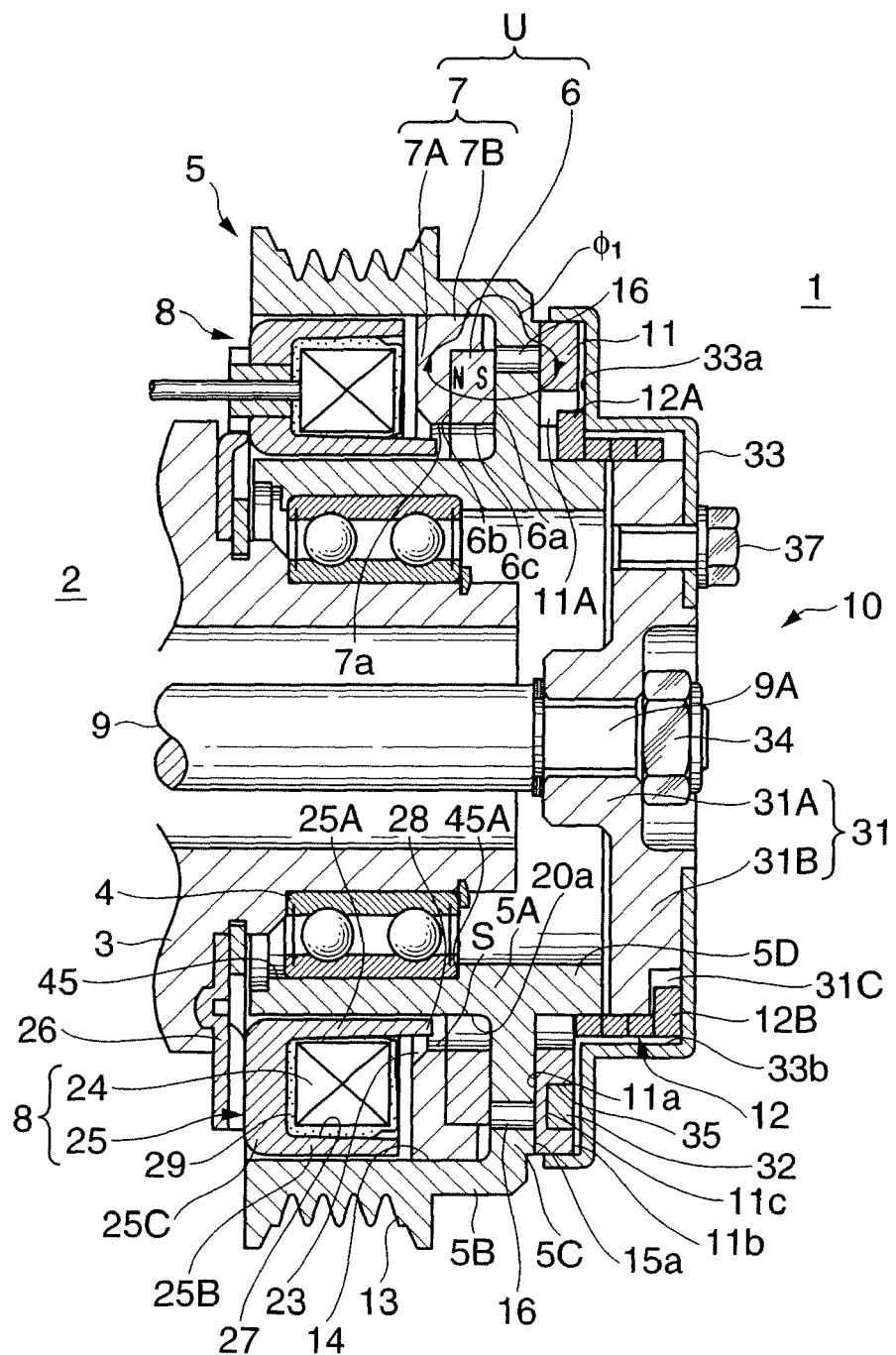
FIG. 1 is a sectional view showing an electromagnetic clutch in a power transmission state according to the first embodiment of the present invention.
Figure 2:
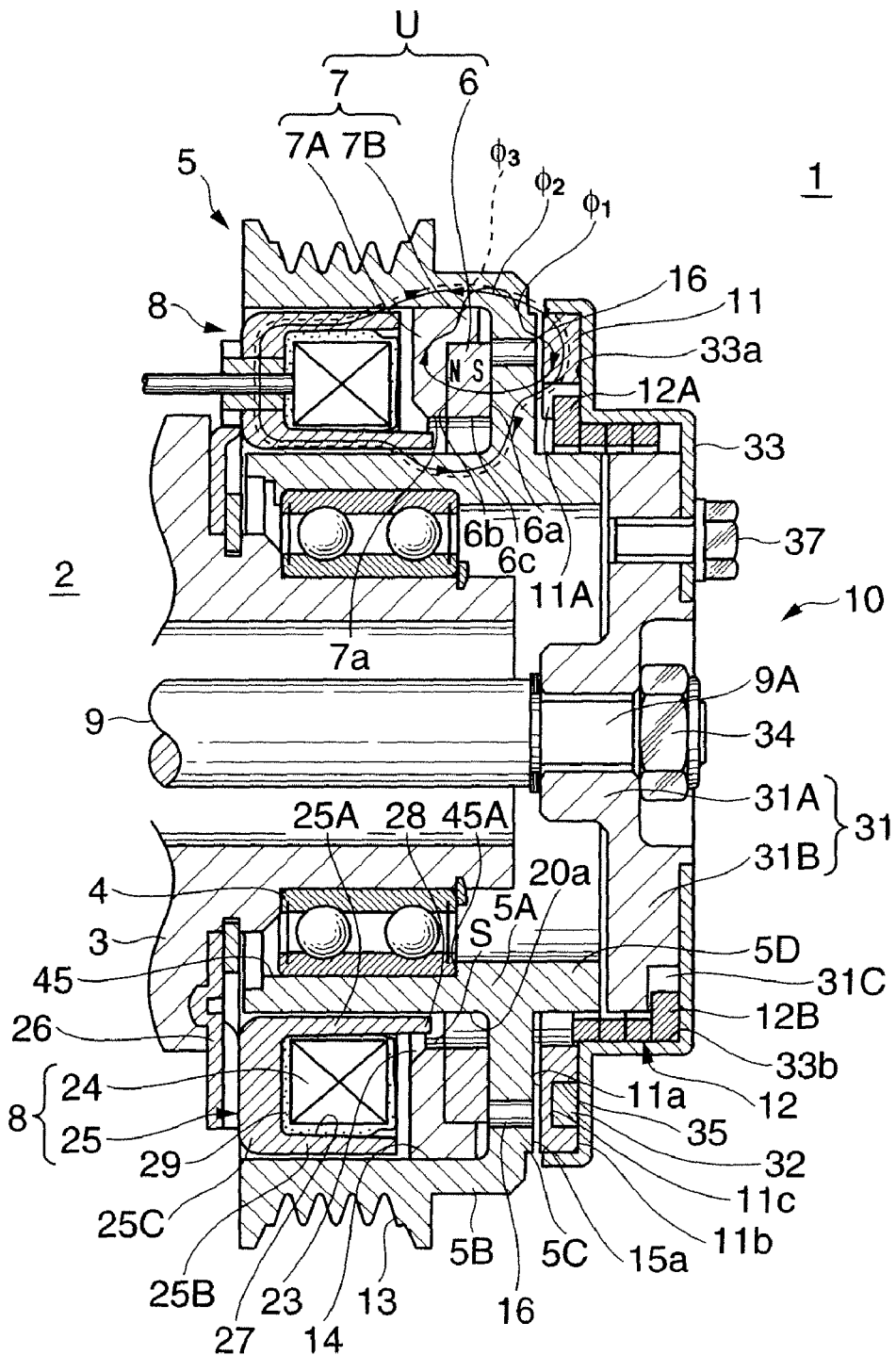
FIG. 2 is a sectional view showing a power transmission cut-off state.
Figure 3:
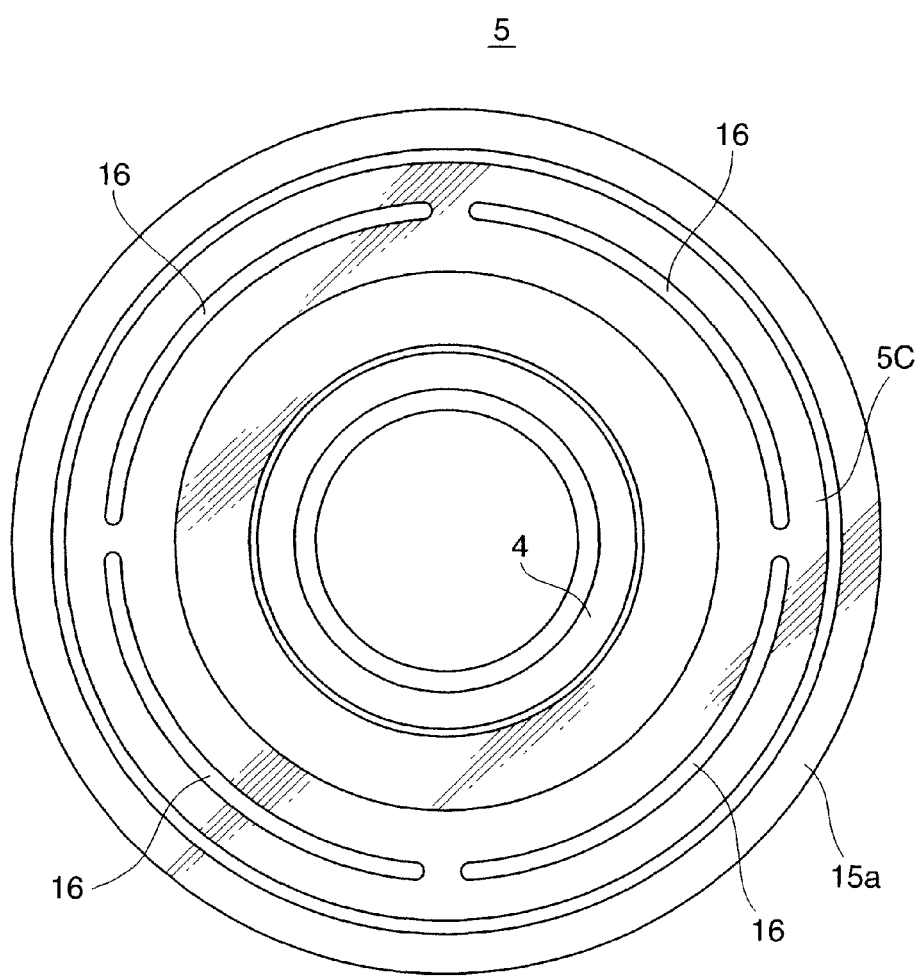
FIG. 3 is a front view of a rotor.

FIGS. 1 to 3 show an embodiment in which the present invention is applied to an electromagnetic clutch 1 which transmits and cuts off rotation of an engine (not shown) serving as a driving device to the rotating shaft of a water pump as a driven device.

The electromagnetic clutch 1 forms a self-hold electromagnetic spring clutch which transmits power by using both a permanent magnet and coil spring, and roughly includes a rotor 5 rotatably disposed in a housing 3 of a water pump 2 through a bearing 4, a magnet unit U and excitation coil device 8 incorporated in the rotor 5, and an armature assembly 10 which transmits the rotation of the rotor 5 to a rotating shaft 9 of the water pump 2. The magnet unit U includes a power transmission permanent magnet 6 and magnetic body 7. The armature assembly 10 includes an armature 11, coil spring 12, armature hub 31, and spring cover 33.

The rotor 5 forms a double-cylinder structure having an open end on the water pump 2 side, so it integrally includes an inner cylindrical magnetic path portion 5A and outer cylindrical magnetic path portion 5B which are concentric, a disc-like magnetic path portion 5C which connects the ends of the two magnetic path portions 5A and 5B on the armature 11 side, and a cylindrical connecting portion 5D projecting from the end of the inner cylindrical magnetic path portion 5A on the armature 11 side. The bearing 4 rotatably, axially supports the inner cylindrical magnetic path portion 5A. The rotor 5 has an annular groove 14 defined by the inner cylindrical magnetic path portion 5A, outer cylindrical magnetic path portion 5B, and disc-like magnetic path portion 5C and open to the water pump 2. The magnet unit U and excitation coil device 8 are disposed in the annular groove 14.

The inner cylindrical magnetic path portion 5A and cylindrical connecting portion 5D of the rotor 5 have the same outer diameter and inner diameter. The outer cylindrical magnetic path portion 5B of the rotor 5 has a plurality of V-shaped grooves 13 formed in its outer surface. The power of a vehicle engine is transmitted to the V-shaped grooves 13 through a V-belt (not shown). That surface of the disc-like magnetic path portion 5C of the rotor 5 which opposes the armature 11 forms a connecting surface (frictional surface) 15a with respect to the armature 11. The disc-like magnetic path portion 5C has, in its portion close to the outer surface, a plurality of through holes 16 which detour a magnetic flux $\phi_1$ of the power transmission permanent magnet 6 from the disc-like magnetic path portion 5C to the armature 11. As shown in FIG. 3, the through holes 16 are formed of arcuate slits formed on one circle and communicate with the annular groove 14. Consequently, the electromagnetic clutch 1 of this embodiment forms a single flux type clutch employing the plurality of through holes 16 formed on one circle. Generally, the rotor 5 is fabricated by hot-forging or cold-forging carbon steel for machine structure (S12C) or hot-rolled steel (SPHC).

The power transmission permanent magnet 6 which forms the magnet unit U together with the magnetic body 7 is a magnet that attracts the armature 11 during power transmission so that that surface (frictional surface) 11a of the armature 11 which opposes the rotor 5 is kept connected to the connecting surface 15a of the rotor 5 by magnetic attraction. The power transmission permanent magnet 6 forms a ring-like shape and has an inner diameter larger than the outer diameter of the inner cylindrical magnetic path portion 5A of the rotor 5 and an outer diameter smaller than the inner diameter of the outer cylindrical magnetic path portion 5B of the rotor 5. The power transmission permanent magnet 6 is magnetized in the axial direction such that, e.g., its surface (front surface) 6a opposing the armature 11 forms an S pole and its surface (rear surface) 6b on the magnetic body 7 side forms an N pole, thus forming a parallel magnetic field type magnet. Such a power transmission permanent magnet 6 is made of a ferromagnetic material having a Curie temperature Q, sufficiently lower than the temperature of heat generated by the rotor 5 upon slip rotation. For example, the temperature of heat generated by the rotor 5 upon slip rotation is, e.g., approximately 600° C. Hence, as the material of the power transmission permanent magnet 6, a neodymium-iron-boron-based magnet having a Curie temperature $Q_1$ of approximately 300° C. to 350° C. is desirably used. By considering easiness in incorporation into the rotor 5, the power transmission permanent magnet 6 is incorporated in the rotor 5 together with the magnetic body 7, and after that the front and rear surfaces 6a and 6b are magnetized from outside the rotor 5. Although the power transmission permanent magnet 6 is formed of one magnet in this embodiment, the present invention is not limited to this. A plurality of magnets arranged on one circle may be integrated by resin molding, or temporarily fixed using a temporary fixing member, as will be described later, to form the power transmission permanent magnet 6.

The magnetic body 7 includes an annular portion 7A and an annular projecting portion 7B which is continuously, integrally formed on the outer surface of the annular portion 7A, so that the section of the magnetic body 7 forms an L-shaped ring. The magnetic body 7 is incorporated in the annular groove 14 of the rotor 5 together with the power transmission permanent magnet 6. The annular portion 7A of the magnetic body 7 has an inner diameter larger than the outer diameter of the inner cylindrical magnetic path portion 5A of the rotor 5 and almost equal to the inner diameter of the power transmission permanent magnet 6. The power transmission permanent magnet 6 is fitted inside the projecting portion 7B. An annular appropriate space S is defined by inner surfaces 6c and 7a of the power transmission permanent magnet 6 and magnetic body 7, respectively, and an outer surface 20a of the inner cylindrical magnetic path portion 5A. A chamfered portion 23 chamfered at an angle of approximately 45° is formed on that edge of the inner surface 7a of the magnetic body 7 which is on the excitation coil device 8 side. The chamfered portion 23 is formed to increase the distance to an extension 28 of a field core 25 (to be described later), thus increasing the magnetic resistance.

The excitation coil device 8 includes an excitation coil 24 and the field core 25. The excitation coil 24 is stored in the field core 25 and molded with a synthetic resin 29.

The field core 25 is fixed to an attaching plate 26 attached to the housing 3, and is inserted in the annular groove 14 of the rotor 5 loosely, in other words, in noncontact with the annular groove 14. The field core 25 is formed of an inner cylindrical portion 25A and outer cylindrical portion 25B which are concentric, and a disc portion 25C which connects the ends of the two cylindrical portions 25A and 25B on a side opposite to the magnet unit U, to have a double-cylinder structure. The space surrounded by the cylindrical portions 25A and 25B and disc portion 25C forms an annular storing recess 27 which stores the excitation coil 24. The storing recess 27 is open to the deep end side (the magnet unit U side) of the annular groove 14 of the rotor 5 and opposes the magnetic body 7. Furthermore, the extension 28 integrally extends from the distal end of the inner cylindrical portion 25A in the axial direction of the field core 25. When the field core 25 is loosely inserted in the annular groove 14 of the rotor 5, the extension 28 is inserted in the space S. The extension 28 may have such a length to reach the interior of the magnet unit U, and desirably the interior of the power transmission permanent magnet 6. As the outer cylindrical portion 25B of the field core 25 has no extension 28 at its distal end, it is shorter than the inner cylindrical portion 25A, and its distal end opposes the outer peripheral edge of the rear surface of the magnetic body 7 at a small gap.

The armature 11 is formed from a material such as carbon steel for machine structure (S12C) or hot-rolled steel (SPHC) into a disc shape, in the same manner as the rotor 5, and disposed inside the spring cover 33 to be movable in the axial direction. The armature 11 surrounds the outer surface of the connecting portion 5D of the rotor 5. That surface 11a of the armature 11 which opposes the disc-like magnetic path portion 5C forms a magnetic pole surface (frictional surface). During power transmission, as shown in FIG. 1, the surface 11a is connected to the frictional surface 15a of the rotor 5 by the magnetic force of the power transmission permanent magnet 6. That surface 11b of the armature 11 which opposes the spring cover 33 has a plurality of recesses 11c formed equiangularly on one circle. Armature releasing permanent magnets 32 are fitted and fixed in the recesses 11c.

The armature hub 31 includes a boss 31A and a disc-like flange 31B integrally projecting from the outer surface of the boss 31A. The boss 31A is spline-connected to a projecting end 9A of the rotating shaft 9 which projects from the housing 3 and fixed to it with a nut 34. The outer diameter of the flange 31B is almost equal to that of the connecting portion 5D of the rotor 5.

The armature releasing permanent magnets 32 serve to separate the armature 11 from the rotor 5 and render it to be magnetically attracted to the spring cover 33 when the electromagnetic clutch 1 is switched from the power transmission state to the power cut-off state by energizing the excitation coil 24. The armature releasing permanent magnets 32 include, e.g., eight magnets, and are disposed in the plurality of recesses 11c, respectively, formed in the armature 11. The armature releasing permanent magnets 32 are made of a ferromagnetic material having a Curie temperature $Q_2$ sufficiently higher than the temperature (approximately 600° C.) of heat generated by the rotor 5 upon friction with the armature 11 during slip rotation, e.g., a samarium-cobalt-based magnet having a Curie temperature $Q_2$ of approximately 700° C. to 800° C. Even if the power transmission permanent magnet 6 loses its magnetic force due to the heat generated by the slip rotation of the rotor 5 and changes from a ferromagnetic body to a paramagnetic body, the armature releasing permanent magnets 32 will not lose their magnetic force and serve as magnets. During power transmission, the armature 11 must be kept connected to the rotor 5 against the magnetic force of the armature releasing permanent magnets 32 and the spring force of the coil spring 12. For this purpose, as the material of the power transmission permanent magnet 6, a permanent magnet having a higher magnetic force than that of the armature releasing permanent magnets 32 is used.

The spring cover 33 is made of a magnetic material and fixed to the flange 31B of the armature hub 31 with a bolt 37, so it covers the cylindrical connecting portion 5D of the rotor 5, the flange 31B of the armature hub 31, the armature 11, and the coil spring 12. A flat surface 33a portion of the inner surface of the spring cover 33 which opposes the armature 11 forms a release holding portion that attracts and holds the armature releasing permanent magnets 32 when power transmission is cut-off, that is, when the rotor 5 is not connected to the armature 11.

The coil spring 12 is formed of a coil spring having a rectangular section, and is wound across the outer surface of the connecting portion SD of the rotor 5 and the outer surface of the flange 31B of the armature hub 31. One end 12A of the coil spring 12 is locked in a locking recess 11A formed in the inner surface of the armature 11 such it will not come off. The other end of the coil spring 12 is locked in a locking recess 31C formed in the outer surface of the armature hub 31 such that it will not come off. When the electromagnetic clutch 1 is in the power transmission cut off state, the coil spring 12 is held in a natural state, as shown in FIG. 2. Thus, the coil spring 12 has an inner diameter larger than the outer diameters of the outer surfaces of the connecting portion 5D of the rotor 5 and of the flange 31B of the armature hub 31, and is spaced apart from the outer surfaces of the connecting portion 5D and flange 31B. At this time, the outer surface of the coil spring 12 is in contact with an inner surface 33b of the spring cover 33. When the electromagnetic clutch 1 is in the power transmission state, that is, when the rotor 5 and armature 11 are connected to each other, as shown in FIG. 1, the magnetic force of the power transmission permanent magnet 6 moves the armature 11 toward the rotor 5, so the armature 11 is frictionally coupled to the frictional surface 15a of the rotor 5. Thus, as the rotor 5 and armature 11 rotate, the coil spring 12 reduces its diameter and tightly rolls the outer surfaces of the connecting portion 5D of the rotor 5 and of the flange 31B of the armature hub 31, thus mechanically connecting the rotor 5 to the armature hub 31.

The operation of the electromagnetic clutch 1 having the above structure will now be described.

FIG. 1 shows the electromagnetic clutch 1 in the power transmission state. In this state, due to the magnetic force generated by the magnetic flux $\phi_1$ of the power transmission permanent magnet 6, the armature 11 is spaced apart from the spring cover 33 and magnetically attracted to the frictional surface 15a of the rotor 5. The coil spring 12 reduces its diameter upon rotation of the rotor 5 and armature 11 and tightly rolls the outer surfaces of the connecting portion 5D of the rotor 5 and of the flange 31B of the armature hub 31, thereby connecting the rotor 5 and armature hub 31. Therefore, the rotor 5 and armature assembly 10 are firmly connected to each other by the magnetic force of the power transmission permanent magnet 6 and the rolling force of the coil spring 12. In this connected state, power from the engine is transmitted to the rotating shaft 9 of the water pump 2 through the rotor 5—the armature 11—the coil spring 12—the armature hub 31. In the power transmission state, this electromagnetic clutch 1 deenergizes the excitation coil 24 and holds it in a non-excitation state. Thus, the electromagnetic clutch 1 forms a non-excitation actuation type electromagnetic clutch.

When cutting off power transmission by releasing the electromagnetic clutch 1 in the power transmission state, as shown in FIG. 2, the excitation coil 24 is energized to generate a magnetic flux $\phi_2$ having a flowing direction opposite to that of the magnetic flux $\phi_1$ of the power transmission permanent magnet 6. When the excitation coil 24 is excited by energization, its magnetic flux $\phi_2$ passes a magnetic flux path extending through the inner cylindrical portion 25A of the field core 25—the inner cylindrical magnetic path portion 5A of the rotor 5—the disc-like magnetic path portion 5C—the armature 11—the disc-like magnetic path portion 5C of the rotor 5—the outer cylindrical magnetic path portion 5B—the outer cylindrical portion 25B of the field core 25—the disc portion 25C.

At this time, the excitation coil 24 is energized and excited such that the magnetic force generated by the magnetic flux $\phi_2$ of the excitation coil 24 becomes equal to that of the power transmission permanent magnet 6. Therefore, the magnetic force of the power transmission permanent magnet 6 and that of the excitation coil 24 cancel each other, and accordingly the armature 11 is released from the magnetic force of the power transmission permanent magnet 6. As the magnetic force of the armature releasing permanent magnets 32 is not canceled by energization and excitation of the excitation coil 24, the armature releasing permanent magnets 32 magnetically attract the armature 11 and separate it from the rotor 5, so the armature 11 is magnetically attracted to the release holding portion 33a of the spring cover 33. In other words, the armature releasing permanent magnets 32 draw back the armature 11 from the rotor 5 and connect it to the release holding portion 33a of the spring cover 33. The magnetic flux of the armature releasing permanent magnets 32 passes the magnetic flux path of the armature 11—the spring cover 33.

When the armature 11 is released from the power transmission permanent magnet 6 and drawn back from the rotor 5 to the spring cover 33 by the magnetic force of the armature releasing permanent magnets 32, the coil spring 12 is also released from the power transmission permanent magnet 6. Thus, the coil spring 12 enlarges in diameter and separates from the outer surfaces of the connecting portion 5D of the rotor 5 and of the flange 31B of the armature hub 31. As a result, power transmission from the rotor 5 to the rotating shaft 9 by the electromagnetic clutch 1 is cut off completely. FIG. 2 shows this state.

After cutting off power transmission to the water pump 2, when the electromagnetic clutch 1 is to be actuated again, the excitation coil 24 is energized. At this time, the current flowing direction is changed to a direction opposite to that described above, and a magnetic flux $\phi_3$ (a magnetic flux indicated by a broken line in FIG. 2) in the same direction as the magnetic flux $\phi_1$ of the power transmission permanent magnet 6 is generated. The armature 11 is separated from the spring cover 33 by the magnetic forces generated by the magnetic fluxes $\phi_1$ and $\phi_3$ against the magnetic force of the armature releasing permanent magnets 32, and magnetically attracted to the frictional surface 15a of the rotor 5. When the armature 11 rotates together with the rotor 5, the coil spring 12 reduces its diameter and tightly rolls the outer surfaces of the connecting portion 5D of the rotor 5 and of the flange 31B of the armature hub 31. Therefore, the rotor 5 and armature assembly 10 are firmly connected to each other again by the magnetic force of the power transmission permanent magnet 6 for the armature 11 and the rolling force of the coil spring 12, and the power of the engine is transmitted to the water pump 2 through the rotor 5—the armature 11—the coil spring 12—the armature hub 31—the rotating shaft 9. In other words, the electromagnetic clutch 1 is actuated. After the electromagnetic clutch 1 is actuated, the excitation coil 24 is deenergized, and the power transmission permanent magnet 6 and coil spring 12 hold the rotor 5 and armature assembly 10 in the connected state and perform power transmission.

Figure 4:
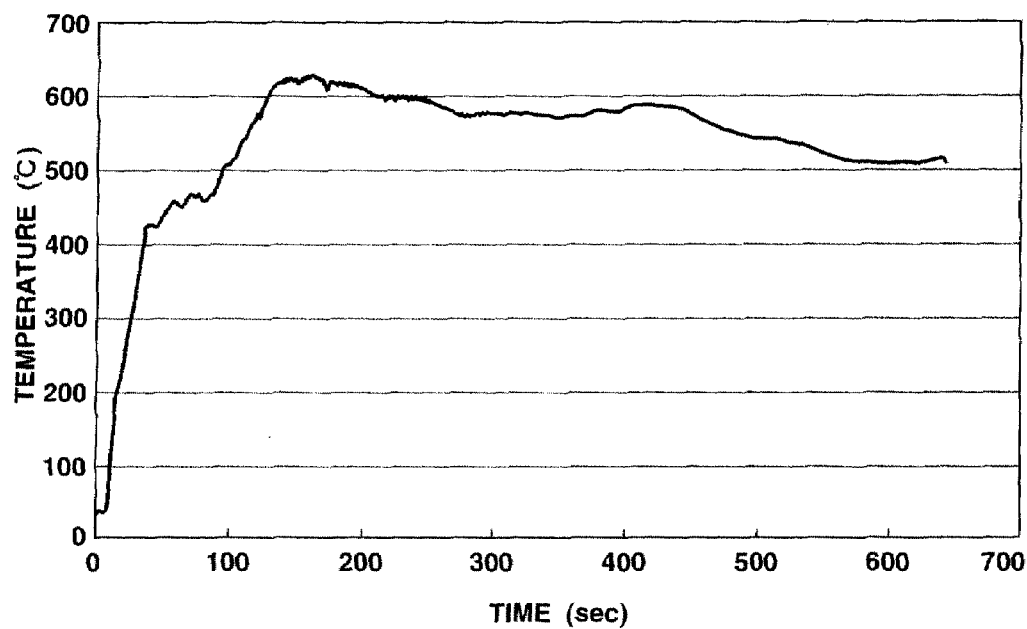
FIG. 4 is a graph showing a temperature change of an armature.

In the power transmission state, if the rotating shaft 9 stops due to an overload or the like, or oil is attached to the frictional surfaces of the rotor 5 and armature 11 to cause the rotor 5 to slip-rotate with respect to the armature 11, the frictional heat heats the rotor 5 and armature 11 sharply. The temperature of heat generated by the rotor 5 at this time is approximately 600° C. Hence, the temperature of the armature 11 also rises sharply as shown in FIG. 4.

The power transmission permanent magnet 6 is made of a neodymium-iron-boron-based magnet having the Curie temperature $Q_1$ of 300° C. to 350° C. Upon slip rotation of the rotor 5, when the temperature of the heat generated by the rotor 5 and armature 11 becomes higher than the Curie temperature $Q_1$, the power transmission permanent magnet 6 loses its magnetic force, changes from a ferromagnetic body to a paramagnetic body, and releases the armature 11. Therefore, the armature 11 is drawn back from the frictional surface 15a of the rotor 5 to the release holding portion 33a of the spring cover 33 by the magnetic force of the armature releasing permanent magnets 32. When the armature 11 is released from the power transmission permanent magnet 6 and separated from the rotor 5, the coil spring 12 is also released. Therefore, the coil spring 12 enlarges in diameter and separates from the outer surfaces of the connecting portion 5D of the rotor 5 and of the flange 31B of the armature hub 31. As a result, the rotor 5 idles, and temperature rise is suppressed. Accordingly, accidents such as burnout of the belt extending in the V-shaped grooves 13 of the rotor 5 or outflow of the grease of the bearing 4 which axially supports the rotor 5, leading to the seizure of the bearing 4, can be prevented.

The armature releasing permanent magnets 32 are made of a samarium-cobalt-based magnet having the Curie temperature $Q_2$ sufficiently higher than the temperature of heat generated by the rotor 5 and armature 11 upon slip rotation of the rotor 5. Therefore, the armature releasing permanent magnets 32 will not lose the magnetic force or change from a ferromagnetic body to a paramagnetic body. During slip rotation of the rotor 5, the armature releasing permanent magnets 32 separate the armature 11 from the rotor 5 and cause it to be magnetically attracted to the spring cover 33. After the power transmission permanent magnet 6 that has changed from the ferromagnetic body to the paramagnetic body is restored to room temperature, if it is magnetized again, it can be used as a magnet again.

With the electromagnetic clutch 1 having the structure described above, damages to the belt, burnout of the bearing 4, and the like during slip rotation can be eliminated by only making the power transmission permanent magnet 6 from a magnet having the Curie temperature $Q_1$ lower than the temperature of heat generated by the rotor 5 upon slip rotation. Hence, the electromagnetic clutch 1 has a simple structure, does not require any other component such as a temperature fuse, and can be fabricated at a low cost.

The armature releasing permanent magnets 32 are made from a magnet having the Curie temperature $Q_2$ higher than the temperature of heat generated by the rotor 5 during slip rotation. Even if the rotor 5 generates heat due to the slip rotation, the armature releasing permanent magnets 32 do not lose the function as the magnet, and can separate the armature 11 from the rotor 5 reliably.

As the electromagnetic clutch 1 is integrally provided with the extension 28 extending from the distal end of the inner cylindrical portion 25A of the field core 25, it can reduce magnetic saturation. More specifically, assume that the field core 25 and magnetic body 7 are merely arranged to oppose each other at an appropriate gap and that a portion corresponding to the extension 28 is not provided. In this case, the sectional area of the magnetic path at a portion of the inner cylindrical magnetic path portion 5A of the rotor 5 which is located between the magnetic body 7 and field core 25 is determined by only the sectional area of the corresponding portion. This portion is a thin-walled portion where a step 45 (FIG. 1) for the bearing 4 is formed on the inner surface. Thus, the magnetic path sectional area is smaller than that of other portions of the inner cylindrical magnetic path portion 5A. At a portion of the inner cylindrical magnetic path portion 5A which is in the vicinity of a bearing abutting portion 45A, that is, in the vicinity of that portion of the step 45 which abuts against the front end of the bearing 4, the magnetic flux $\phi_2$ ($\phi_3$) of the excitation coil 24 tends to magnetically saturate easily. When magnetic saturation occurs, the magnetic permeability in the magnetic circuit lowers, and the magnetic force for the armature 11 decreases.

In view of this, if the extension 28 integrally extends from the distal end of the inner cylindrical portion 25A of the field core 25 and is inserted in the space S defined by the power transmission permanent magnet 6, the magnetic body 7, and the inner cylindrical magnetic path portion 5A of the rotor 5, the magnetic path of the inner cylindrical portion 25A of the field core 25 can be elongated, and the magnetic path sectional area in the vicinity of the bearing abutting portion 45A can increase by the added sectional area of the extension 28 of the field core 25. Therefore, when compared to a case in which no extension 28 is provided, magnetic saturation at the inner cylindrical magnetic path portion 5A of the rotor 5 is suppressed more, and the magnetic force for the armature 11 can increase.

Furthermore, since the chamfered portion 23 is formed at the opening edge of the inner surface 7a of the magnetic body 7 on the field core 25 side, the distance between the outer surface of the inner cylindrical portion 25A of the field core 25 and the inner surface 7a of the magnetic body 7 increases, and the magnetic resistance increases, thus suppressing magnetic flux leakage (short circuiting). As a result, the magnetic force for the armature 11 can further increase.

Figure 5:
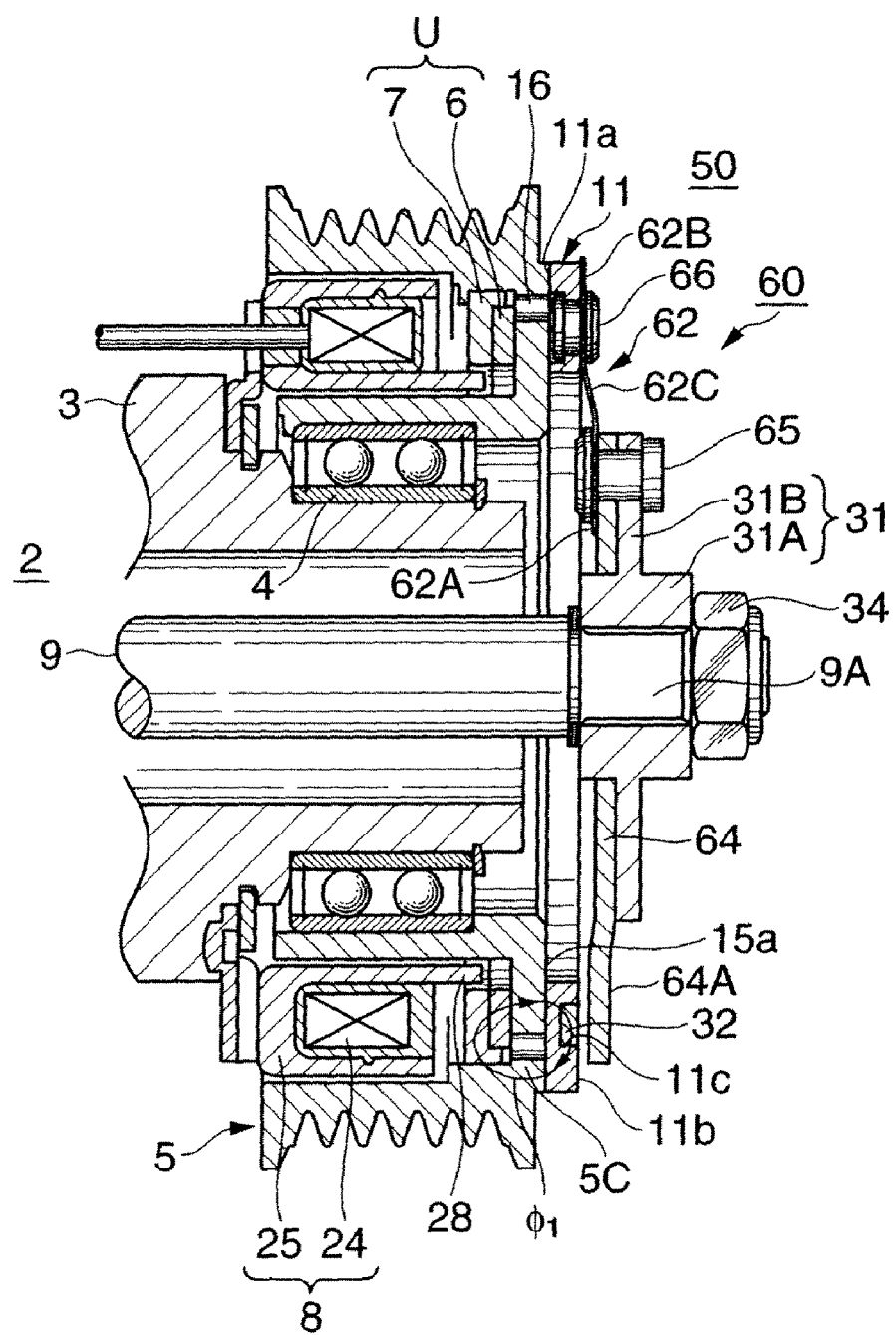
FIG. 5 is a sectional view showing an electromagnetic clutch in a power transmission state according to the second embodiment of the present invention.
Figure 6:
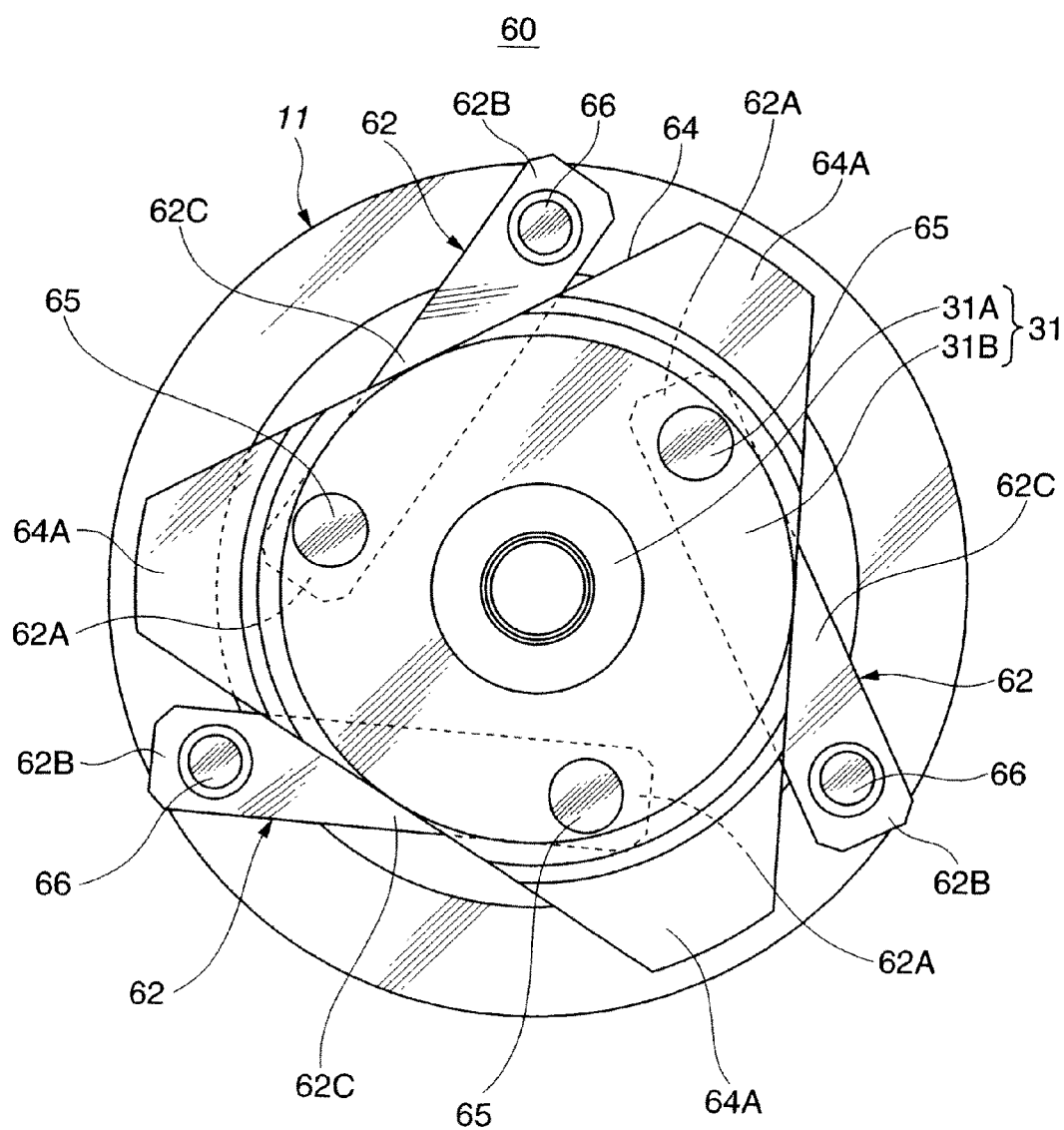
FIG. 6 is a front view of an armature assembly.
Figure 7:
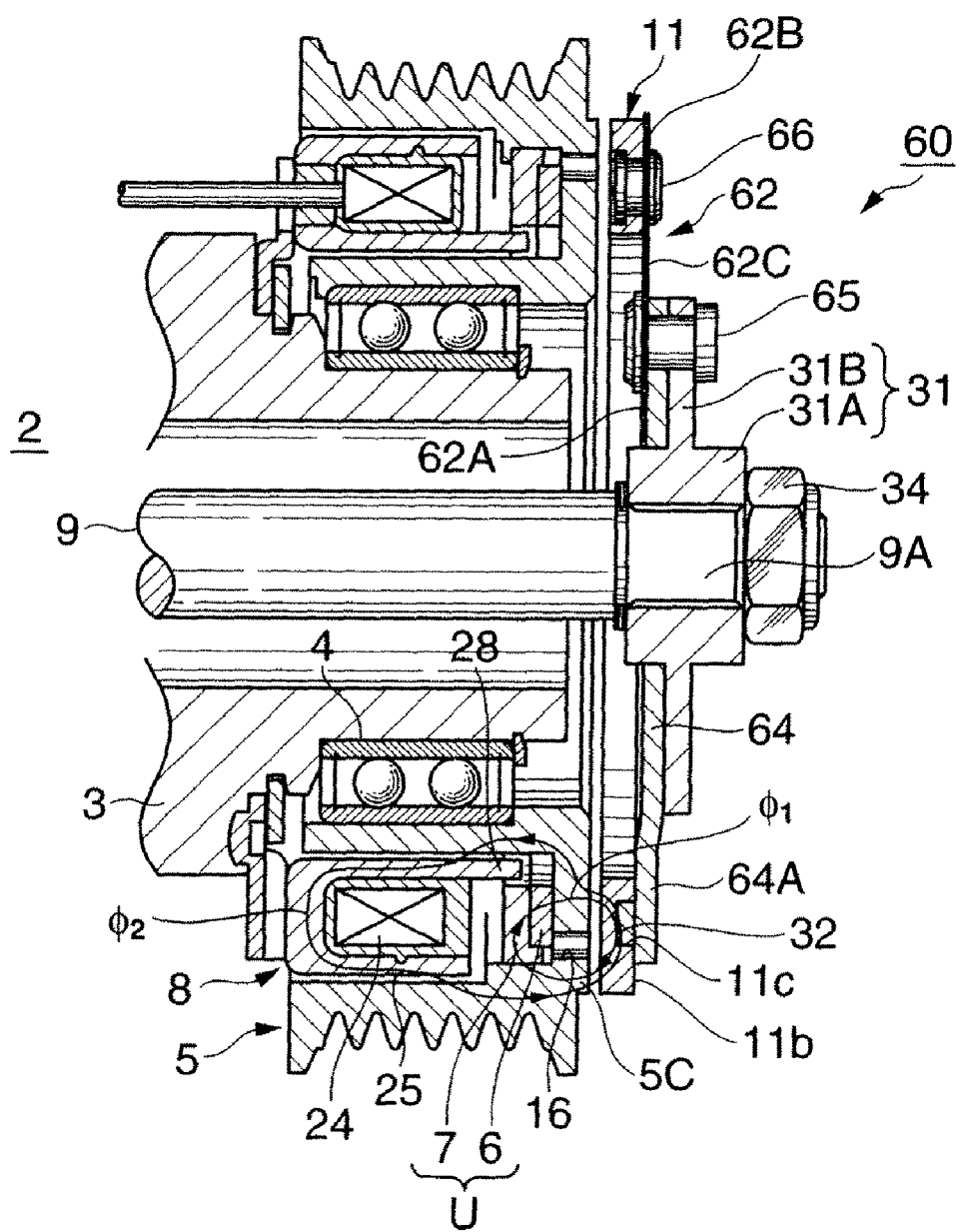
FIG. 7 is a sectional view showing a power transmission cut-off state.

FIGS. 5 to 7 show an electromagnetic clutch according to the second embodiment of the present invention. In the second embodiment, the same constituent components and portions as those of the first embodiment described above are denoted by the same reference numerals, and a repetitive description will be omitted. In an electromagnetic clutch 50 according to this embodiment, an armature assembly 60 is different from the armature assembly 10 of the electromagnetic clutch 1 described in the first embodiment. More specifically, the armature assembly 60 does not include a coil spring and spring cover identical to the coil spring 12 and spring cover 33 described above, but includes an armature 11, armature hub 31, armature releasing permanent magnets 32, leaf springs 62, and stopper plate 64. As the armature assembly 60 includes no coil spring 12, a connecting portion SD is omitted in a rotor 5.

The armature 11 is attached to the armature hub 31 through the three leaf springs 62 to be movable in the axial direction.

Each leaf spring 62 is formed by punching a steel sheet for spring or the like into a rectangular shape to include a stationary base 62A and free end 62B (FIG. 6). The stationary bases 62A are brought into tight contact with the rear surface of a flange 31B of the armature hub 31 and are fixed to it by caulking with a plurality of rivets 65. The free ends 62B are brought into tight contact with a surface of the armature 11 opposite to a frictional surface 11a and fixed by caulking with rivets 66. Each leaf spring 62 includes a connecting portion 62C which connects the stationary base 62A and free end 62B. The connecting portion 62C is elastically deformable in the direction of thickness, and is bent at a required angle toward the rotor 5 such that the free end 62B is located on the more front side than the stationary base 62A in the rotational direction of the armature hub 31.

The stopper plate 64 is fixed, together with the stationary bases 62A of the leaf springs 62, to the rear surface of the flange 31B of the armature hub 31 by caulking with the rivets 65. The stopper plate 64 is formed of a magnetic material to have an almost triangular shape when seen from the front. The vertexes of the stopper plate 64 are bent toward the rotor 5 and form release holding portions 64A for the armature 11.

In the electromagnetic clutch 50 including such an armature assembly 60, in the power transmission state shown in FIG. 5, the armature 11 is connected to a frictional surface 15a of the rotor 5 by a magnetic force generated by a magnetic flux $\phi_1$ of a power transmission permanent magnet 6. Therefore, the leaf springs 62 elastically deform toward the rotor 5.

When releasing the electromagnetic clutch 50 from the power transmission state and cutting off power transmission, as shown in FIG. 7, an excitation coil 24 is energized, and a magnetic force generated by a magnetic flux 42 of the excitation coil 24 cancels the magnetic force generated by the magnetic flux $\phi_1$ of the power transmission permanent magnet 6. Hence, the leaf springs 62 are elastically restored, and separate the armature 11 from the rotor 5 and deform it toward the stopper plate 64. The armature 11 is magnetically attracted to the release holding portions 64A of the stopper plate 64 by the magnetic force of the armature releasing permanent magnets 32. Note that the release holding portions 64A of the stopper plate 64 are bent toward the rotor 5 because the leaf springs 62 are sandwiched between the armature 11 and the flange 31B of the armature hub 31.

In a general electromagnetic clutch in which an armature is held by leaf springs, a preset load is applied to the leaf springs. When releasing the armature, the armature 11 is separated from the rotor 5 by only the elastic restoration force of the leaf springs. In the electromagnetic clutch 50 of this embodiment, as the armature 11 is separated from the rotor 5 by the magnetic force of the armature releasing permanent magnets 32, no preset load need be applied to the leaf springs 62. As the leaf springs 62 merely form a power transmission member, they are not always necessary. For example, if the inner surface of the armature 11 and the outer surface of a boss 31A of the armature hub 31 are connected to each other by spline fitting or the like, the leaf springs 62 can be omitted. Also, if the flange 31B of the armature hub 31 is provided with a release holding portion (the magnetic path portion of an armature releasing permanent magnet), the stopper plate 64 can be omitted.

Figure 8:
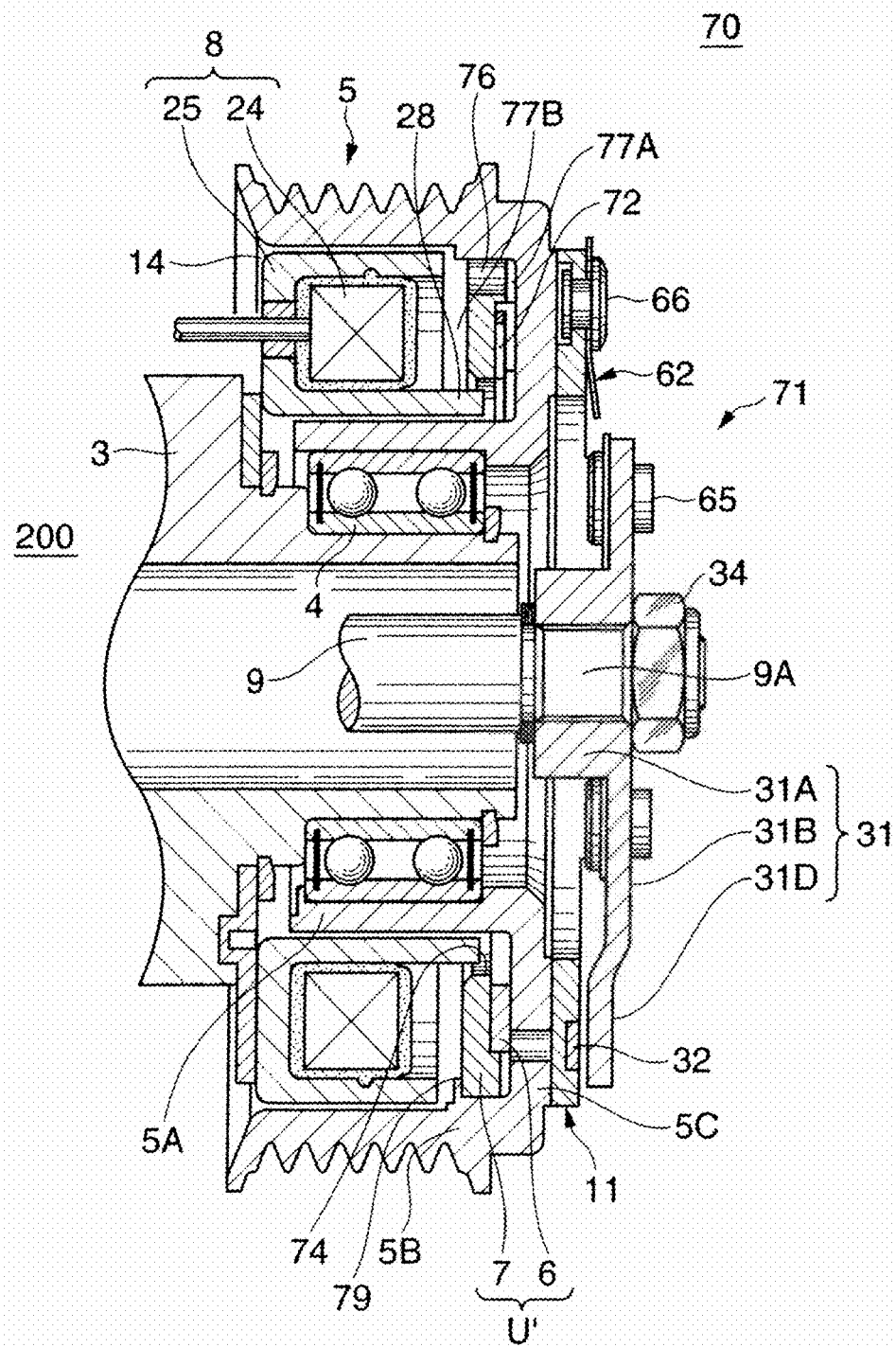
FIG. 8 is a sectional view showing an electromagnetic clutch in a power transmission state according to the third embodiment of the present invention.
Figure 9:
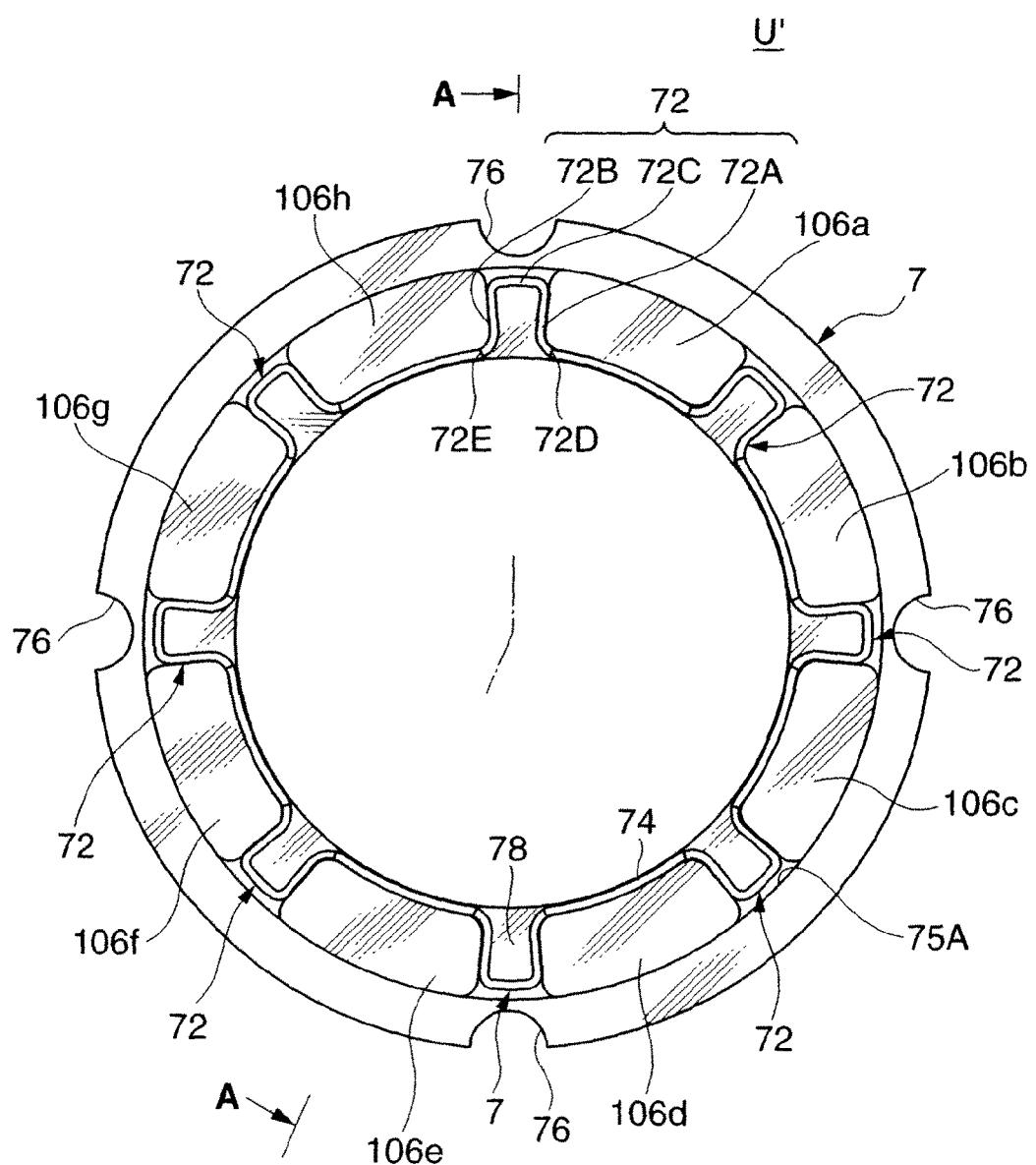
FIG. 9 is a plan view of a magnet unit.
Figure 10:
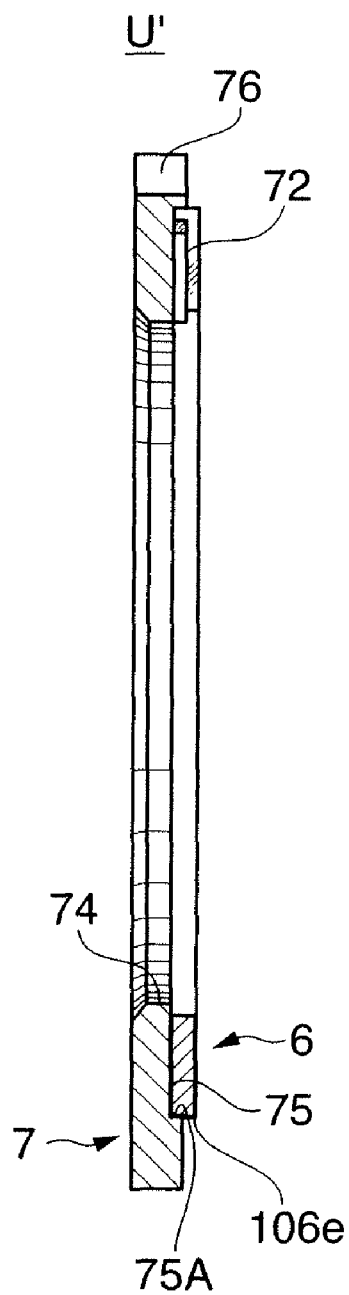
FIG. 10 is a sectional view taken along the line A-A of FIG. 9.

FIGS. 8 to 10 show an electromagnetic clutch according to the third embodiment of the present invention. In the third embodiment, the same constituent components and portions as those of the second embodiment shown in FIGS. 5 to 7 are denoted by the same reference numerals, and a repetitive description will be omitted. In an electromagnetic clutch 70 of the third embodiment, an armature assembly 71 is different from the armature assembly 60 of the second embodiment, and the arrangement of a magnet unit U' is different from that of the magnet unit U of the electromagnetic clutch 1 of the first embodiment and that of a magnet unit U of the electromagnetic clutch 50 of the second embodiment. More specifically, the electromagnetic clutch 70 does not include a stopper plate corresponding to the stopper plate 64 described above, but includes an armature 11, armature hub 31, armature releasing permanent magnets 32, and leaf springs 62. The armature hub 31 includes a boss 31A spline-fitted to an end 9A of a rotating shaft 9, a flange 31B projecting on the outer surface of the boss 31A, and three release holding portions 31C projecting on the outer surface of the flange 31B equidistantly in the circumferential direction and opposing the armature 11. Namely, the armature hub 31 integrally has the release holding portions 31D, so it also serves as the stopper plate 64 of the second embodiment.

The magnet unit U' includes a power transmission permanent magnet 6, a magnetic body 7, and temporarily fixing members 72 which temporarily fix the permanent magnet 6 to the magnetic body 7. The power transmission permanent magnet 6 has a ring-like shape formed of, e.g., eight arcuate magnet pieces 106a to 106h divided in the circumferential direction.

The magnet pieces 106a to 106h are fabricated from a ferromagnetic material such as neodymium or ferrite, and their front and rear surfaces are magnetized in N and S poles. Note that the magnet pieces 106a to 106h are magnetized after they are incorporated in a rotor 5 together with the magnetic body 7.

The magnetic body 7 forms a disc having a center hole 74 larger than the outer diameter of an inner cylindrical magnetic path portion 5A of the rotor 5 and an outer diameter almost equal to the inner diameter of an outer cylindrical magnetic path portion 5B. An annular recess 75 to fit with the power transmission permanent magnet 6 is formed in the surface of the magnetic body 7 on the armature 11 side. The hole diameter of the annular recess 75 is almost equal to the outer diameter of the permanent magnet 6, in other words, the diameter of a circle formed by the outer circumferences of the magnet pieces 106a to 106h. The outer circumferences of the magnet pieces 106a to 106h are brought into tight contact with an inner wall 75A of the annular recess 75. The magnetic body 7 has a plurality of discharge openings 76. The discharge openings 76 serve to facilitate discharge of air and treatment liquid that accumulate in the rotor 5 during surface treatment of the rotor 5 such as plating or coating. In this embodiment, the discharge openings 76 are semicircular notches formed in the outer surface of the magnetic body 7. However, the present invention is not limited to this, and the discharge openings 76 can be through holes having appropriate shapes. With such discharge openings 76, in a state in which the magnet unit U' is incorporated in an annular groove 14 of the rotor 5, a space 77A on the deeper end side and a space 77B (FIG. 8) on the front side with respect to the magnet unit U' in the annular groove 14 can communicate with each other through the discharge openings 76. Then, in the subsequent treatment, air and treatment liquid can be prevented from accumulating in the space 77A on the deeper end side.

In FIG. 9, in a state before the magnet unit U' is incorporated in the rotor 5, the temporary fixing members 72 serve to temporarily fix the nonmagnetized magnet pieces 106a to 106h to the magnetic body 7. Each temporary fixing member 72 is formed of a wire spring, synthetic resin, or the like into an almost U- or Ω-shape to include elastic deforming portions 72A and 72B opposing each other and a connecting portion 72C which connects the proximal ends of the two elastic deforming portions 72A and 72B. The free ends of the elastic deforming portions 72A and 72B are provided with locking portions 72D and 72E, respectively, which are bent outward. As shown in FIG. 9, after the magnet pieces 106a to 106h are arranged in the annular recess 75 of the magnetic body 7 at predetermined gaps 78 in the circumferential direction to form a ring, the temporary fixing members 72 are elastically mounted in the gaps 78 with their elastic deforming portions 72A and 72B closed. When elastically mounted, the elastic deforming portions 72A and 72B open by elastic restoration and press the side surfaces of the magnet pieces 106a to 106h. Also, the locking portions 72D and 72E urge the inner circumferential corners of each of the magnet pieces 106a to 106h. As the outer surfaces of the magnet pieces 106a to 106h are brought into tight contact with the inner wall 75A of the annular recess 75, they are temporarily fixed to the magnetic body 7, thus assembling the magnet unit U'. The magnet unit U' is incorporated in the rotor 5 with their magnet pieces 106a to 106h being temporarily fixed to the magnetic body 7. In incorporation, the magnetic body 7 is pressed into the annular groove 14 of the rotor 5 to urge the magnet pieces 106a to 106h against the inner surface of a disc-like magnetic path portion 6C, and is fixed to the inner surface of the outer cylindrical magnetic path portion 5B. The magnetic body 7 can be fixed to the outer cylindrical magnetic path portion 5B by caulking, electron beam welding, laser welding, or the like. FIG. 8 shows a case in which the magnetic body 7 is fixed by caulking. Reference numeral 79 denotes the caulking portion of the outer cylindrical magnetic path portion 5B.

The temporary fixing method and temporary fixing members for the magnet pieces 106a to 106h are not limited to those described in the above embodiment, but can be changed and modified in various manners. For example, the magnet pieces 106a to 106h may be arranged in a ring-like shape such that every two ones are spaced apart from adjacent two other ones, and the temporary fixing members 72 may be elastically mounted in the respective gaps, thus temporarily fixing the magnet pieces 106a to 106h. Alternatively, the plurality of temporary fixing members 72 may be a single continuous member formed by bending one wire stock.

To manufacture such an electromagnetic clutch 70, the plurality of magnet pieces 106a to 106h and magnetic body 7 are prepared. The magnet pieces 106a to 106h are temporarily fixed to the annular recess 75 of the magnetic body 7 with the temporary fixing members 72, thus assembling the magnet unit U'. In this state, as the magnet pieces 106a to 106h are not magnetized yet, they are not magnetically attracted to the magnetic body 7.

Subsequently, the magnet unit U' is incorporated in the rotor 5, and the magnet pieces 106a to 106h are urged against the inner surface of the disc-like magnetic path portion 5C of the rotor 5. Then, the magnetic body 7 is caulked to the inner surface of the outer cylindrical magnetic path portion 5B and fixed to it by, e.g., electron beam welding.

After the magnet unit U' is completely incorporated in the rotor 5, the rotor 5 undergoes surface treatment such as plating or coating. For example, when the rotor 5 is to undergo cation electrodeposition coating, the rotor 5 is dipped in a cation electrodeposition coating liquid in an electrodeposition bath. A voltage is applied between the rotor 5 as a cathode and an anode, so that a cation electrodeposition coating film is formed on the entire surface of the rotor 5.

When the rotor 5 is dipped in the cation electrodeposition coating liquid, if air or the coating liquid remains locally in the rotor 5, it causes a coating defect. Air or the coating liquid tends to remain particularly at that portion of the space 77A on a deeper end side of the magnetic body 7 which is outside the outer surface of the power transmission permanent magnet 6. The discharge openings 76 formed in the outer surface of the magnetic body 7 allow the space 77A on the deeper end side to communicate with the space 77B on the front side with respect to the magnetic body 7. Thus, air or the coating liquid in the deeper end-side space 77A can be reliably discharged outside the rotor 5 through the front-side space 77B. As a result, the problems described above can be solved.

As the magnet unit U' undergoes surface treatment after it is incorporated in the rotor 5, it will not be accidentally damaged while being incorporated in the rotor 5 to have a defective appearance.

When electrodeposition is ended, the rotor 5 is extracted from the electrodeposition bath and heated in a heating furnace, so that the cation electrodeposition film is baked.

When electrodeposition coating is ended, the magnet pieces 106a to 106h are magnetized. The magnet pieces 106a to 106h can be magnetized from outside the rotor 5 by a magnetization device.

When the magnetization for the magnet pieces 106a to 106h is ended, a bearing 4 is press-fitted in the rotor 5. This completes the manufacturing assembly of the rotor 5.

Subsequently, the rotor 5 and armature assembly 71 are mounted in a compressor 2, and an excitation coil device 8 is inserted in the rotor 5, thus completing the operation of attaching the electromagnetic clutch 70 to the compressor 200 as a driven device.

With the electromagnetic clutch 70 having the above structure, it is apparent that the same effect as that of each of the electromagnetic clutches 1 and 50 of the first and second embodiments described above can be obtained.

In each of the embodiments described above, the armature 11 is provided with the armature releasing permanent magnets 32. However, the present invention is not limited to this. The spring cover 33, the stopper plate 64, or the release holding portion (33a, 64A, or 31C) side of the armature hub 31 may be provided with the armature releasing permanent magnets 32.

So far the present invention is applied to single flux type electromagnetic clutches. However, the present invention is not limited to this, but can also be applied to a vehicle air-conditioning double flux type electromagnetic clutch.

In the present invention, when the rotor causes slip rotation with respect to the armature due to an overload or the like, the rotor and armature are heated by frictional heat. When the temperature of heat generated by the rotor exceeds the Curie temperature of the power transmission permanent magnet, the power transmission permanent magnet loses its magnetism and changes from a ferromagnetic body to a paramagnetic body. Thus, the armature is released from the power transmission permanent magnet and separated from the rotor by the magnetic force of the armature releasing magnet. Therefore, the rotor idles and suppresses temperature rise caused by the frictional heat. In this case, if the Curie temperature of the power transmission permanent magnet is sufficiently lower (e.g., 300° C. to 350° C.) than the temperature (e.g., approximately 600° C.) of heat generated by the rotor due to the frictional heat, the temperature of heat generated by the rotor can be suppressed low. Consequently, belt burnout, bearing seizure, and the like can be prevented more effectively.

According to the present invention, the Curie temperature of the armature releasing permanent magnet is higher than the temperature of heat generated by the rotor upon slip rotation. Therefore, even when the rotor generates heat, the armature releasing permanent magnet does not change from a ferromagnetic body to a paramagnetic body, so that the armature can be reliably separated from the rotor.

According to the present invention, as the power transmission permanent magnet is made of a permanent magnet having a higher magnetic force than that of the armature releasing permanent magnet, the former has a large magnetic force. Thus, during power transmission, the armature can be kept magnetically attracted to the rotor reliably.

According to the present invention, the extension integrally extends from the distal end of the inner cylindrical portion of the field core, and the sectional area of the extension is included in the sectional area of the inner cylindrical magnetic path portion of the rotor. This suppresses magnetic saturation in the inner cylindrical magnetic path portion of the rotor, so that a decrease in magnetic force with respect to the armature can be prevented.

According to the present invention, the chamfer portion is formed on the opening edge of the magnetic body on the field core side. This can increase the magnetic resistance between the extension of the field core and the inner surface of the magnetic body, thus suppressing magnetic flux leakage (short circuiting).

According to the present invention, since the power transmission permanent magnet includes the plurality of magnet pieces, an expensive one-piece permanent magnet need not be used, thus reducing the manufacturing cost.

The magnet pieces are temporarily fixed to the magnetic body by the temporary fixing members and are incorporated in the rotor. After that, the magnetic body and magnet pieces are fixed to the rotor, and the magnet pieces are magnetized. Thus, the magnetic body and the power transmission permanent magnet can be assembled easily, thus improving the productivity.

As the elastic temporary fixing members can be formed of a wire spring, synthetic resin, metal sheet, or the like, they can be manufactured at a low cost easily, and can be temporarily, reliably fixed by urging the magnet pieces against the inner wall of the magnetic body.

What is claimed is:

1. An electromagnetic clutch comprising:
a rotor rotatably surrounding a housing of a driven device;
an armature hub fixed to a rotating shaft of the driven device;
an armature disposed on said armature hub to be movable in an axial direction;
a magnetic body incorporated in said rotor and a first permanent magnet which connects said armature to said rotor;
a field core attached to the housing and inserted in said rotor to be in noncontact therewith;
an excitation coil which is disposed in said field core and excited, when cutting off power transmission, to cancel a magnetic force of said first permanent magnet, thus releasing said armature from said first permanent magnet; and
a second permanent magnet which separates said armature from said rotor, when cutting off power transmission, to move said armature toward said armature hub,
wherein said first permanent magnet has a Curie temperature lower than a temperature of heat generated by said rotor upon slip rotation,
wherein said rotor comprises an inner cylindrical magnetic path portion and an outer cylindrical magnetic path portion which are concentric, a disc-like magnetic path portion which connects one end of said inner cylindrical magnetic path portion to that of said outer cylindrical magnetic path portion, and an annular groove which accommodates said magnetic body, said first permanent magnet, and said field core,
an annular space is defined by an inner surface of said magnet body which is annular, an inner surface of said first permanent magnet, and the inner cylindrical magnetic path portion, and
said field core integrally includes an extension to be inserted in the space.

2. A clutch according to claim 1, wherein said second permanent magnet has a Curie temperature higher than the temperature of heat generated by said rotor upon slip rotation.

3. A clutch according to claim 1, wherein said first permanent magnet is made of a permanent magnet having a magnetic force higher than that of said second permanent magnet.

4. A clutch according to claim 1, wherein the Curie temperature of said first permanent magnet is 300° C. to 350° C., and that of said second permanent magnet is 700° C. to 800° C.

5. A clutch according to claim 1, wherein said magnetic body includes a chamfered portion formed on an opening edge on a field core side.

6. A clutch according to claim 1,
wherein said first permanent magnet comprises a plurality of magnet pieces (106a to 106h),
the plurality of magnet pieces being temporarily fixed to said magnetic body by a temporary fixing member to have a ring-like shape and thereafter fixed in said rotor by said magnetic body.

7. A clutch according to claim 6, wherein
said magnetic body includes an annular recess where the plurality of magnet pieces each forming an arc are to be arranged to form a ring-like shape, and
the temporarily fixing member having elasticity is interposed between the magnet pieces and urges outer circumferences of the magnet pieces against an inner wall of the annular recess.

8. A clutch according to claim 7, wherein the magnet pieces are incorporated in said rotor and thereafter magnetized.

* * * * *